(12) United States Patent
Kweon et al.

(10) Patent No.: US 6,585,931 B1
(45) Date of Patent: Jul. 1, 2003

(54) MOLTEN CARBONATE FUEL CELL ANODE AND METHOD FOR MANUFACTURING THE SAME

(75) Inventors: Ho-Iin Kweon, Seoul (KR); Keon Kim, Koyang (KR); Chan-Gyu Joo, Kangwon-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/742,127

(22) Filed: Oct. 31, 1996

Related U.S. Application Data

(62) Division of application No. 08/443,329, filed on May 17, 1995, now abandoned.

(51) Int. Cl.$^7$ ................................ B22F 1/02; B22F 3/12
(52) U.S. Cl. ............................. 419/19; 419/35; 419/38; 427/217; 427/299
(58) Field of Search ............................. 419/19, 35, 38; 427/217, 299

(56) References Cited

U.S. PATENT DOCUMENTS

| | | | | |
|---|---|---|---|---|
| 4,247,604 A | * | 1/1981 | Marianowski et al. | 429/40 |
| 4,404,267 A | * | 9/1983 | Iacovangelo et al. | 429/41 |
| 4,828,613 A | * | 5/1989 | Hoshino et al. | 420/460 |
| 4,997,729 A | * | 3/1991 | Hatoh et al. | 429/40 |
| 5,041,159 A | * | 8/1991 | Doyon et al. | 75/232 |
| 5,229,221 A | * | 7/1993 | Donado et al. | 429/13 |
| 5,312,582 A | * | 5/1994 | Donado | 419/19 |
| 5,354,627 A | * | 10/1994 | Hatoh et al. | 429/40 |
| 5,415,833 A | * | 5/1995 | Kweon et al. | 419/58 |

* cited by examiner

Primary Examiner—Ngoclan Mai
(74) Attorney, Agent, or Firm—Sughrue Mion, PLLC

(57) ABSTRACT

A manufacturing method of a molten carbonate fuel cell (MCFC) anode includes the steps of: forming a Ni coating solution for coating a surface of alumina powder by mixing nickel acetate and ethanol in a predetermined ratio, adding distilled water to the mixture in a predetermined ratio and refluxing the resultant; coating a pre-treated surface of alumina powder with the Ni coating solution; mixing a pure Ni powder and Ni-coated alumina powder obtained in the Ni coating step, and then forming a green sheet of an electrode from the mixture of pure Ni powder and Ni-coated alumina powder; and drying and sintering the electrode in a reducing atmosphere. Thus, various problems in manufacturing conventional anodes of Ni-metal alloy powder can be solved, and an anode for an MCFC having greatly enhanced creep resistance and electrode performance can be obtained.

3 Claims, 4 Drawing Sheets

MOLTEN CARBONATE FUEL CELL ANODE AND METHOD FOR MANUFACTURING THE SAME

This application is a division of application Ser. No. 08/443,329 filed May 17, 1995, now abandoned.

FIELD OF THE INVENTION

The present invention relates to a molten carbonate fuel cell (MCFC) anode and a method for manufacturing the same, and more particularly, to an MCFC anode comprising pure nickel (Ni) powder and Ni-coated alumina powder and a method for manufacturing the same, for improving creep resistance and performance of a nickel (Ni) electrode used as the MCFC anode.

BACKGROUND OF THE INVENTION

A fuel cell is a new electricity generating system for directly converting the energy produced by electrochemical reaction of a fuel gas and an oxidizing gas into electric energy. A fuel cell is similar to a general cell in that it is composed of two electrodes and an electrolyte, but different in that it is provided continuously with fuel and an oxidizing agent as a reactant. A fuel cell is under careful examination for use as power generating equipment, a power source for space stations, a power source for unmanned facilities at sea or along costal areas, a power source for fixed or mobile radios, a power source for automobiles or a power source for household electrical appliances.

Fuel cells are divided into a molten carbonate electrolytic fuel cell which is operated at a high temperature in the range of about 500° C. to about 700° C., a phosphate electrolytic fuel cell which is operated around 200° C., an alkaline electrolytic fuel cell which is operated at room temperature to about 100° C. or below and a solid electrolytic fuel call which is operated at a high temperature of 1,000° C. or above.

A molten carbonate fuel cell is constituted by a porous Ni anode, a Li-doped porous Ni oxide cathode and Li—Al matrix which is filled with lithium and potassium carbonate as the electrolytes. The electrolytes are molten-ionized at about 500° C., and the carbonate ion generated therefrom carries charges between the electrodes. Hydrogen is consumed in the anode area to produce water, carbon dioxide and electrons. The electrons flow to the cathode via an external circuit to produce the desired current flow.

Porous anodes of nickel, cobalt and copper-base are typically used in MCFCs. As mentioned above, since MCFCs are operated at a high temperature of about 650° C., pressure is also applied thereon in order to improve the contact between electrodes and electrolyte matrix, and various layers are stacked to produce the pressure by the load of the stack itself, a creep deformation of the anode is generated. Creep deformation of electrodes is irrevocable and occurs by a combination of at least three different mechanisms of particle rearrangement, sintering and dislocation movement. In other words, performance of electrodes is lowered in various respects, i.e., comminuted pores are reduced due to non-uniform creeps of the respective parts of the anode, thereby reducing the reactive area of the electrode, the contact between electrodes and electrolyte elements becomes poor and the leakage of fuel gas may occur.

Therefore, various methods have been attempted to prevent such an undesirable creep deformation in MCFC anodes. One of the methods is to manufacture anodes by adding Cr or Al to Ni. For example, if a creep test is performed for 100 hours under the conditions of 100 psi and 650° C., the creep rate is about 30% to 50% in the pure porous Ni electrode. In the case of Ni—$LiAlO_2$ obtained by adding $LiAlO_2$ to the Ni electrode, the creep rate is about 14% to 35%. Likewise, in the cases of Ni—Cr (10%) to which lot Cr is added and Ni—Al (10%) to which 10% Al is added, the creep rates are lowered to 5% to 10% and about 2%, respectively. However, a satisfactory performance in operating MCFCs for a long time (40,000 hours) by the development of large capacity of MCFCs has not been achieved yet.

Although Ni—Cr (10%) anodes have been widely used so far, since the price of Cr is high, it is under consideration to add Al to Ni. If Al is added to Ni, the creep rate is lowered to 2% or less and the production cost is lowered since Al is cheaper than Cr.

Ni—Al anodes or Ni—(Al, Cr) anodes obtained by adding Al or Cr to Ni are formed by the same procedure as used for manufacturing the prior anode by forming green sheets by a casting method after forming an alloy powder of Ni and additive metals. However, it is difficult to form a comminuted alloy powder of Ni and metals.

One of the methods developed for preventing creep deformation of a porous anode structure is to internally oxidize alloy metals typically used in the base metal-alloy metal composition.

For example, U.S. Pat. No. 4,314,777 discloses a method for internally oxidizing alloy metal by a heat treatment of the blend powder of an alloy powder and an oxidant base metal, but it is not suitable for use as a porous anode structure because of an end product having high density.

U.S. Pat. No. 4,714,586, which discloses a method for forming dimensionally stable Ni—Cr anodes by internally oxidizing the alloy metal at is high water vapor pressures, is limited to the formation of Ni—Cr anodes.

To solve the aforementioned problems, U.S. Pat. No. 4,999,155 discloses a method for manufacturing MCFC anodes with improved creep resistance property. That is to say, base metal power and alloy metal powder are blended with a binder and solvent and then cast, dried and sintered to form a porous anode structure. Then, oxidant particles are formed internally by internally oxidizing the alloy metal under conditions in which the base metal is reduced and the alloy metal is oxidized.

Another method disclosed in U.S. Pat. No. 4,999,155 is forming an alloy including a base metal and an alloy metal, oxidizing the surface of the alloy by a heat treatment and simultaneously sintering and internally oxidizing the oxidized alloy. Here, the introduction of the alloy metal to the base metal is achieved by tape casting and sintering the mixture of the base metal powder and the alloy metal powder and then diffusing the alloy metal to the base metal. Alternatively, a vapor deposition or a pack cementation is performed after the base metal powder is tape-cast and sintered into a porous structure.

According to this pack cementation method, Ni metal powder is first mixed with a binder and solvent, is cast and is then dried and sintered to form a porous Ni sintered body. Then, the porous nickel sintered body is embedded in a pack consisting of alloy metal powder such as Al, an activator salt and an inert filler, and is heated to about 900° C. in an atmosphere of 10% $H_2$/90% $N_2$, performing a pack cementation and thereby forming Ni—Al alloy. Next, the structure is then internally oxidized at temperatures of 600° C. to 800° C. in a humidified atmosphere having a $pH_2O/pH_2$ greater than 20. According to this method, although the excellent effect in decreasing creep deformation can be obtained, since various complicated procedures such as drying, sintering, pack cementation and internal oxidization should be performed after forming a green sheet with a Ni base metal, practical problems still remain.

As described above, since an anode based on Ni-metal alloy powder and the manufacturing thereof was mainly employed, problems caused by an alloy system could not be completely solved.

SUMMARY OF THE INVENTION

In consideration of various problems as mentioned above, an object of the present invention is to provide an MCFC anode for decreasing creep deformation of an MCFC anode and enhancing the performance of an electrode.

It is another object of the present invention to provide a method for manufacturing an MCFC anode by adding a pure Ni powder and a Ni-coated alumina powder where the surface of the ceramic alumina powder is coated with Ni.

To accomplish the above and other objects of the present invention, there is provided an MCFC anode comprising a pure Ni powder and Ni-coated alumina powder.

Here, it is preferable to regulate the composition ratio of pure Ni powder and Ni-coated alumina powder such that the content of Al is 4–6 wt. % based on the total weight thereof.

To accomplish another object of the present invention, there is provided a method for forming an MCFC anode according to the present invention comprising the steps of: forming a Ni coating solution for coating an alumina powder by mixing nickel acetate and ethanol in a predetermined ratio to form a mixture, adding distilled water to the mixture in a predetermined ratio to form a resultant, and refluxing the resultant; coating a pre-treated surface of the alumina powder with the Ni coating solution to form Ni-coated alumina powder; mixing a pure Ni powder and the Ni-coated alumina powder to form a mixture of pure Ni powder and Ni-coated alumina powder, and then forming a green sheet of an electrode from the mixture of pure Ni powder and Ni-coated alumina powder; and drying and sintering the electrode in a reducing atmosphere.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
FIG. 1 is a scanning electron microscope (SEM) picture of the Ni-coated alumina powder manufactured by one embodiment according to the present invention.

In the step of manufacturing a Ni coating solution for use in coating the surface of the alumina powder, the molar ratio between nickel acetate and ethanol is preferably 1:7–1:15, and so is the molar ratio between nickel acetate and distilled water. More preferably, they are both mixed in a molar ratio of 1:10, respectively. At this time, the reflux temperature can be maintained at 80° C.

According to one embodiment of the present invention, since nickel is converted into nickel hydroxide at a pH higher than 6.5 and the nickel hydroxide is dispersed in a coating solution in the form of microparticles, thereby resulting in a turbid coating solution, acid treatment is performed for preventing this phenomenon. A strong acid such as nitric acid is added to the coating solution to form a transparent coating solution. At this time, the pH of the coating solution is maintained at 3.

The pre-treatment performed prior to coating the surface of the alumina powder with Ni coating solution is a base treatment in order to increase the reactivity, in consideration of the acidity of the Ni coating solution. Preferably, sodium hydroxide is used as the base.

In the step of coating the surface of the alumina powder with the Ni coating solution, according to one embodiment of the present invention, alumina powder is added to the Ni coating solution, the solution is stirred for about one hour by an ultrasonicator to form a precipitate. The precipitate is separated, dried, heat-treated and reduced in a reducing atmosphere, to thereby form a Ni-coated alumina powder.

In the step of manufacturing the green sheet, Ni-coated alumina powder and a pure Ni powder are mixed in a predetermined ratio, a conventional material required for manufacturing an anode including a binder, dispersant, plasticizer, peptizing agent and/or solvent is added to the mixture, which is ball-milled and tape-cast to form the green sheet of the electrode. Here, the mixing ratio between pure Ni powder and Ni-coated alumina powder is adjusted such that the amount of Al is preferably 4–6 wt. % based on the total weight of the mixture obtained.

Sintering of an electrode after drying is preferably performed at a relatively high temperature of 800–900° C. within a conventional sintering temperature range and for a relatively short time of 10–30 minutes in a reducing atmosphere.

Hereinbelow, the present invention will be described in more detail through embodiments. However, the following embodiments are merely illustrative and not intended to limit the present invention. Unless otherwise indicated, all parts, percents, ratios and the like are by weight, except all ratios concerning gases are by volume.

EXAMPLE 1

An anode was manufactured according to the method of the present invention, as follows:

1) Nickel acetate and ethanol were mixed in a molar ratio of 1:10, and distilled water was added to the mixture in a molar ratio of 10:1 with respect to nickel acetate, to reflux the mixture at 80° C.

2) Nitric acid was added to the refluxing solution such that its molar ratio with respect to the Ni was greater than one to form a transparent solution. At that time, the pH of the solution was 3.

3) The solution was refluxed for six hours or longer. Then, the solvent of the solution was evaporated slowly to form a concentrated solution having a volume which was two thirds of the original volume of solution, and the concentrated solution was used as a Ni coating solution in following coating step.

4) NaOH pre-treatment was performed by placing alumina powder having diameters of 5 μm and 1 μm in 3N NaOH solution for two hours.

5) The pre-treated alumina powder was added to the Ni coating solution, and the solution was stirred for one hour. Then, the alumina powder was separated, dried for ten hours in the air, heat-treated for three hours at 400° C., and reduced in a $H_2/N_2$ atmosphere to form Ni-coated alumina powder.

6) The Ni-coated alumina powder and a pure Ni powder (INCO 255 Ni) were mixed in a ratio such that the content of Al is 5 wt. % based on the mixture. Materials required for manufacturing an anode including a binder, dispersant, plasticizer, peptizing agent and solvent were added to the mixture, which was ball-milled for about 48 hours and tape-cast to form the green sheet of the electrode.

7) The electrode was dried and sintered for 30 minutes at 850° C. in a $H_2/N_2$ (80/20) atmosphere to form a porous anode for an MCFC.

Figure 2:
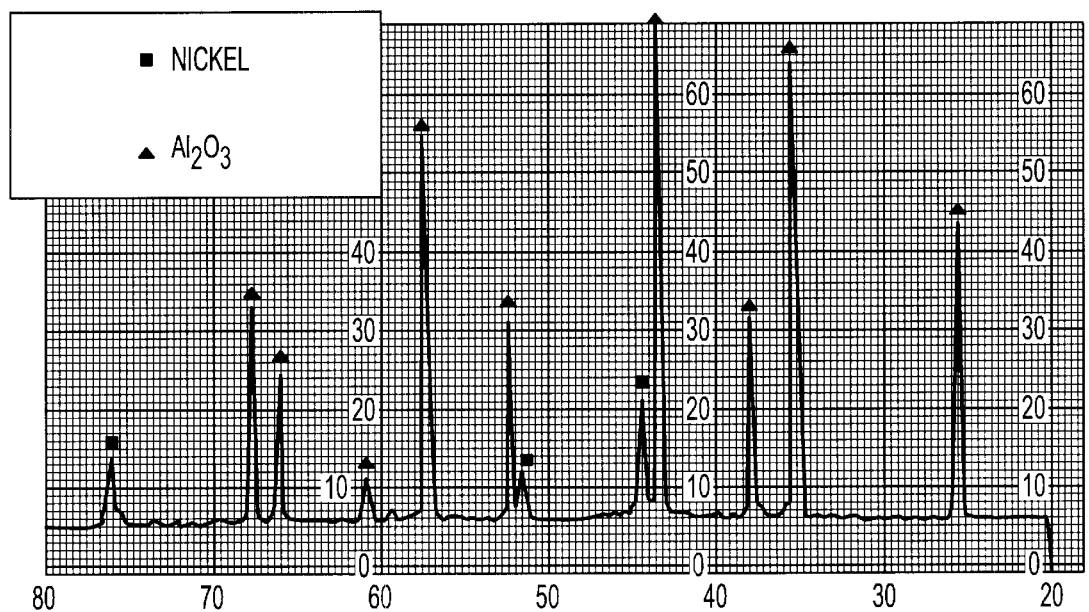
FIG. 2 is an X-ray diffraction analysis chart for the Ni-coated alumina powder manufactured by one embodiment according to the present invention.

FIG. 1 is a scanning electron microscope (SEM) picture of the Ni-coated alumina powder manufactured by Example 1, and FIG. 2 is an X-ray diffraction analysis chart for the Ni-coated alumina powder shown in FIG. 1. These two figures confirm that Ni is coated on the surface of the alumina powder.

Figure 3:
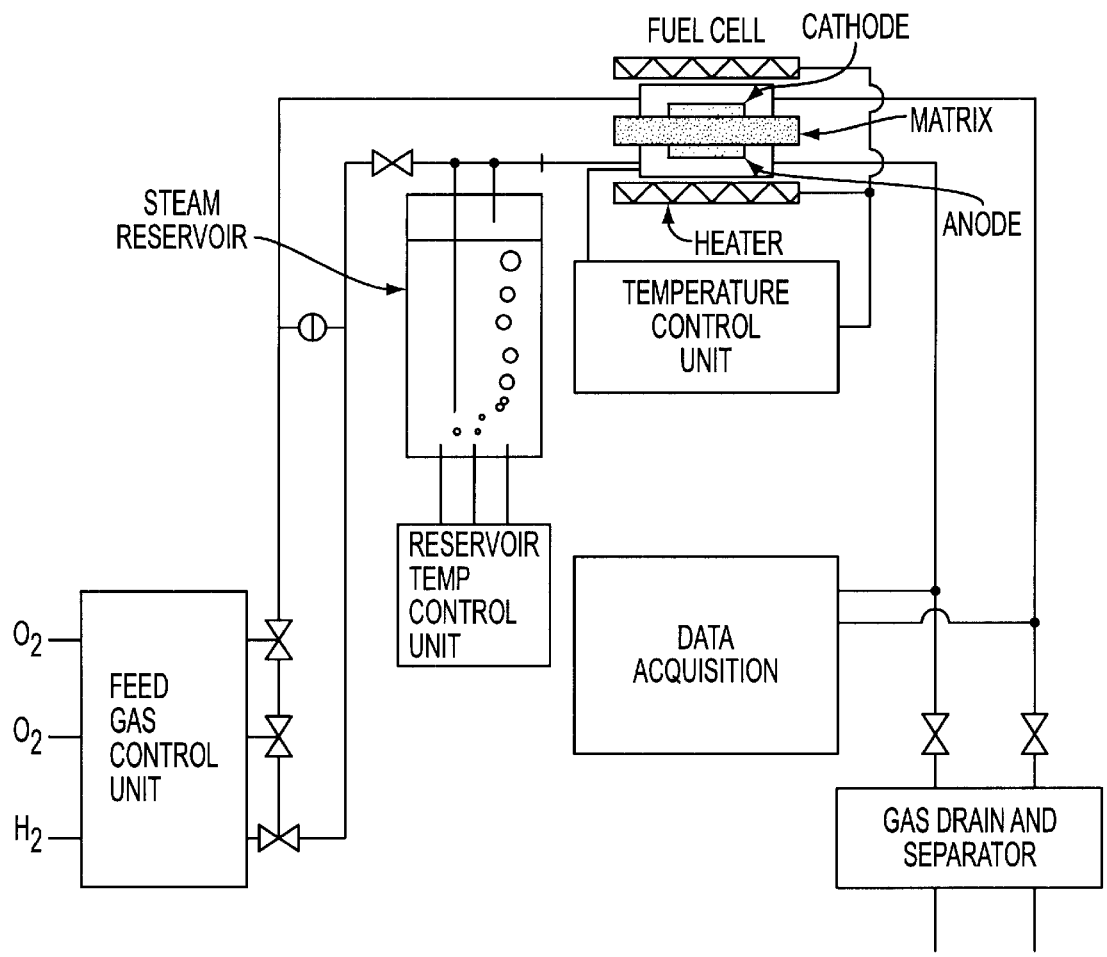
FIG. 3 is a schematic diagram of a lab-size unit cell experimental apparatus.

In order to test the performance of the electrode, a unit cell experiment was performed using the apparatus shown in FIG. 3. The electrode manufactured in Example 1, where Ni-coated alumina powder containing 5 wt. % of Al and INCO 255 Ni were mixed, was used as an anode, and gas containing $H_2/CO_2$ (80/20) and $CO_2/O_2$ (60/40) was supplied to perform the unit cell experiment to give the polarization curve of FIG. 4 represented by voltage versus current density.

Figure 4:
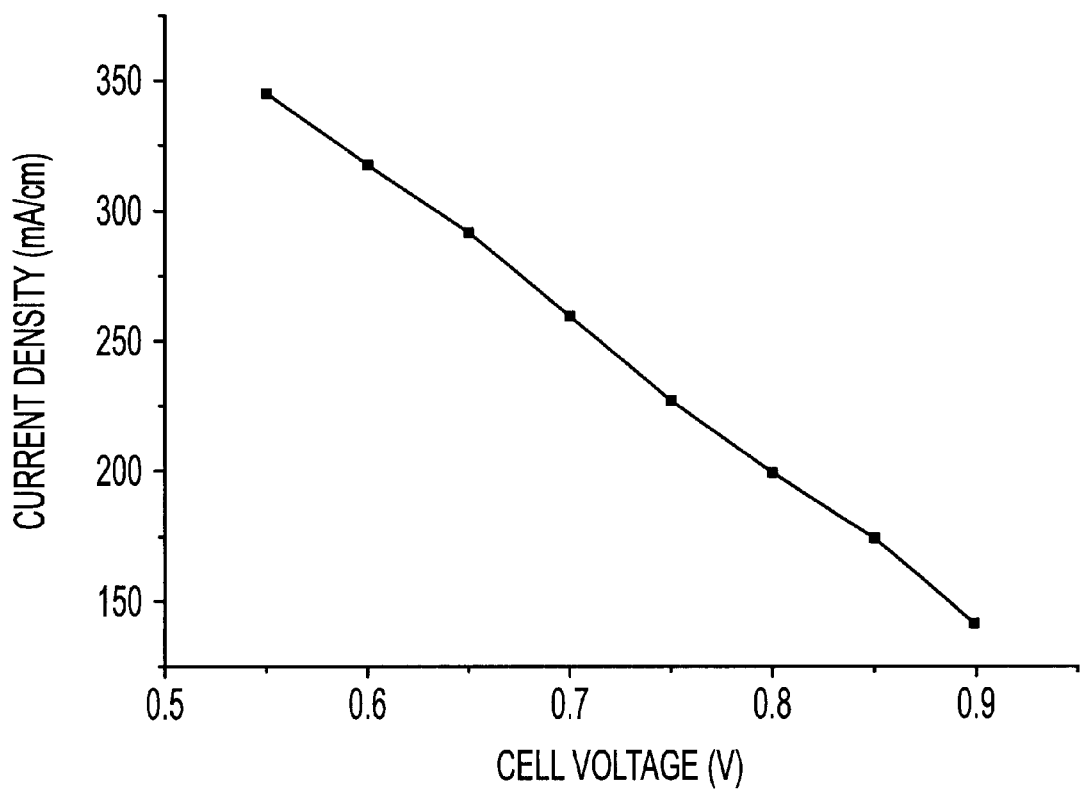
FIG. 4 is a polarization graph showing the performance of the electrode, obtained by a unit cell experiment using an anode manufactured by another embodiment according to the present invention.

From the graph of FIG. 4, an electrode performance of 0.7V and 250 mA/cm$^2$ was shown to be obtained using an anode according to the present invention, which represents a great enhancement in electrode performance compared with a conventional anode (0.7V and 150 mA/cm$^2$).

Figure 5:
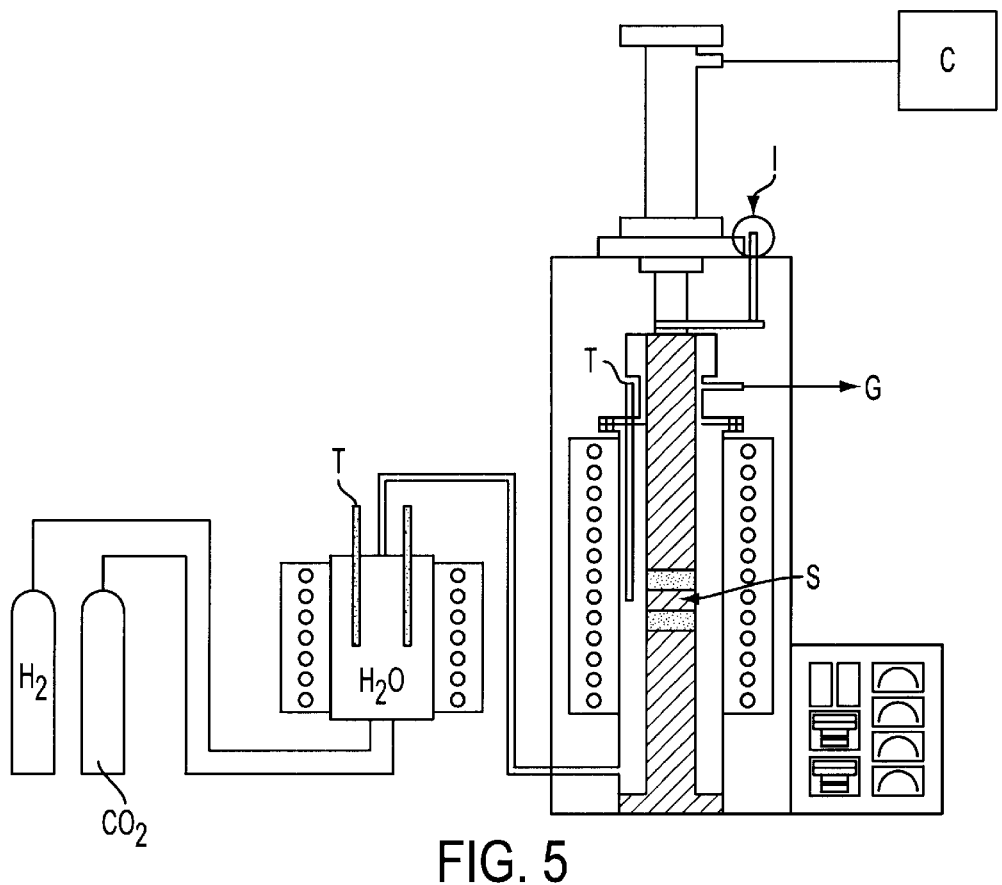
FIG. 5 is a schematic diagram of a creep test apparatus.

Also, in order to test a mechanical strength characteristic of the anode for an MCFC of the present invention, a creep resistance teat was performed using the apparatus shown in FIG. 5. In FIG. 5, reference characters I, G, S, C and T represent an indicator, gas outlet, electrode sample, compressor and thermocouple, respectively.

As a result of the creep resistance test for the anode manufactured by Example 1, the creep rate was 2%, which showed excellent resistance to creep compared with a conventional electrode of pure Ni.

EXAMPLE 2

This example was performed in the same manner as described in Example 1 except that nickel acetate and ethanol were mixed in a molar ratio of 1:12. The molar ratio between acetate nickel and distilled water was also 1:12.

COMPARATIVE EXAMPLE 1

This example was performed in the same manner as described in Example 1 except that nickel acetate and ethanol were mixed in a molar ratio of 1:20. The molar ratio between acetate nickel and distilled water was also 1:20.

COMPARATIVE EXAMPLE 2

This example was performed in the same manner as described in Example 1 except that there was no pre-treatment step by NaOH, in order to determine the effect of the pre-treatment.

EXAMPLE 3

This example was performed in the same manner as described in Example 1 except that pure nickel powder and Ni-coated alumina powder were mixed such that the content of Al was 6 wt. % based on the mixture obtained in the step of manufacturing the green sheet.

COMPARATIVE EXAMPLE 3

This example was performed in the same manner as described in Example 1 except that pure nickel powder and Ni-coated alumina powder were mixed such that the content of Al was 7 wt. % based on the mixture obtained in the step of manufacturing the green sheet.

As a result of the electrode performance tests and creep resistance tests for anodes manufactured by the above examples and comparative examples, a desirable result was obtained when the mixing ratio between pure Ni powder and Ni-coated alumina powder was adjusted in a predetermined range such that the amount of Al was 4–6 wt. % based on the mixture obtained. Also, Ni coating was preferably performed when the molar ratio of nickel acetate and ethanol and that of nickel acetate and distilled water were both 1:7–1:15. More preferably, the molar ratio was 1:10 for both cases. Further, coating reactivity of the Ni coating solution with respect to the alumina powder was greatly increased by pre-treatment.

As described above, by the anode and the manufacturing method thereof according to the present invention where Ni-coated alumina powder obtained by coating the surface of the alumina powder with Ni coating solution and where pure Ni powder are employed, various problems in manufacturing conventional anodes of Ni-metal alloy powder can be solved, and an anode for an MCFC having greatly enhanced creep resistance and electrode performance can be obtained.

While the invention has been described in detail and with reference to specific embodiments thereof, it will be apparent to one skilled in the art that various changes and modifications can be made therein without departing from the spirit and scope thereof.

What is claimed is:

1. A method for forming a molten carbonate fuel cell anode by mixing a pure Ni powder and a Ni-coated alumina powder, the method comprising the steps of:

forming a Ni coating solution for coating an alumina powder by mixing nickel acetate and ethanol in a ratio of 1:7–1:15 to form a mixture, adding distilled water to the mixture in a ratio of 1:7–1:15 to form a resultant, and refluxing the resultant;

pre-treating a surface of said alumina powder with a base to form a pre-treated surface of said alumina powder;

coating said pre-treated surface of said alumina powder with said Ni coating solution to form Ni-coated alumina powder;

mixing a pure Ni powder and said Ni-coated alumina powder to form a mixture of pure Ni powder and Ni-coated alumina powder, and then forming a green sheet of an electrode from the mixture of pure Ni powder and Ni-coated alumina powder; and drying and sintering said electrode in a reducing atmosphere.

2. The method of claim 1 wherein said base is NaOH.

3. The method of claim 1 wherein said pure Ni powder and said Ni-coated alumina powder are mixed such that the amount of Al is 4–6 wt. % based on the total weight of the mixture thereof.

* * * * *